(12) United States Patent
Peck-Pearce et al.

(10) Patent No.: US 11,505,708 B2
(45) Date of Patent: Nov. 22, 2022

(54) CONDENSATION REDUCTION TREATMENT

(71) Applicant: PACKERS SANITATION SERVICES, INC., LTD., Kieler, WI (US)

(72) Inventors: J. Chance Peck-Pearce, Dubuque, IA (US); Ulyana Stebelska, Dubuque, IA (US)

(73) Assignee: PACKERS SANITATION SERVICES, INC., LTD., Kieler, WI (US)

( * ) Notice: Subject to any disclaimer, the term of this patent is extended or adjusted under 35 U.S.C. 154(b) by 0 days.

(21) Appl. No.: 17/066,809

(22) Filed: Oct. 9, 2020

(65) Prior Publication Data

US 2021/0108095 A1 Apr. 15, 2021

Related U.S. Application Data

(60) Provisional application No. 62/914,075, filed on Oct. 11, 2019.

(51) Int. Cl.
*C09D 7/65* (2018.01)
*C09D 7/63* (2018.01)
(Continued)

(52) U.S. Cl.
CPC ................. *C09D 7/65* (2018.01); *C09D 7/45* (2018.01); *C09D 7/48* (2018.01); *C09D 7/63* (2018.01);
(Continued)

(58) Field of Classification Search
CPC ... C09D 7/65; C09D 7/48; C09D 7/45; C09D 7/63; C09D 105/00; C09D 5/002; C09K 3/18; C08L 5/00; G01N 13/00
See application file for complete search history.

(56) References Cited

U.S. PATENT DOCUMENTS 5,366,654 A 11/1994 Van Den Brom et al.
5,753,373 A 5/1998 Scholz et al.
(Continued)

FOREIGN PATENT DOCUMENTS

WO 2005056741 A1 6/2005

*Primary Examiner* — Robert S Walters, Jr.
(74) *Attorney, Agent, or Firm* — Warner Norcross + Judd LLP

(57) ABSTRACT

A method of treating a surface is provided. The method includes disposing a condensation reduction composition on the surface, thereby treating the surface to reduce formation of condensate and/or an amount of condensate thereon. The condensation reduction composition comprises a surface-active agent comprising an alkyl polyglycoside. The condensation reduction composition may further comprise a preservative, a pH control agent, and/or water. A treated surface prepared in accordance with the method is also provided. The method and treated surface prepared therewith are useful in reducing condensate and/or formation of condensate on surfaces, e.g. by reducing the number of condensate drops falling from the surface, increasing the rate of condensate evaporation on the surface, and/or increasing the rate of water absorption into or through the surface, e.g. upon or during exposure of the treated surface to a condensation condition.

19 Claims, 3 Drawing Sheets

(51) Int. Cl.

| | |
|---|---|
| *C09K 3/18* | (2006.01) |
| *C09D 7/45* | (2018.01) |
| *C09D 105/00* | (2006.01) |
| *C09D 7/48* | (2018.01) |
| *G01N 13/00* | (2006.01) |
| *C09D 5/00* | (2006.01) |
| *C08L 5/00* | (2006.01) |

(52) U.S. Cl.
CPC .............. *C09D 105/00* (2013.01); *C09K 3/18* (2013.01); *C08L 5/00* (2013.01); *C09D 5/002* (2013.01); *G01N 13/00* (2013.01)

(56) References Cited

U.S. PATENT DOCUMENTS

| | | |
|---|---|---|
| 6,387,871 B2 | 5/2002 | Faber |
| 6,759,382 B2 | 7/2004 | Ahmed |
| 7,186,675 B2 | 3/2007 | Meine et al. |
| 7,910,647 B2 | 3/2011 | Weide et al. |
| 7,923,428 B2 | 4/2011 | Geffroy et al. |
| 7,939,487 B2 | 5/2011 | Scheuing et al. |
| 8,158,207 B2 | 4/2012 | Swidler |
| 10,155,920 B1 | 12/2018 | Mossoba et al. |
| 2003/0148913 A1 | 8/2003 | Klinkhammer et al. |
| 2005/0215459 A1* | 9/2005 | Policicchio .......... C11D 17/049 510/438 |
| 2011/0312866 A1 | 12/2011 | Hodge et al. |
| 2014/0250585 A1* | 9/2014 | Slothower ................ A47K 3/30 4/614 |

* cited by examiner

CONDENSATION REDUCTION TREATMENT

CROSS-REFERENCE TO RELATED APPLICATIONS

This application claims priority to and all advantages of U.S. Provisional Application No. 62/914,075, filed on 11 Oct. 2019, the content of which is incorporated herein by reference.

FIELD OF THE INVENTION

The present disclosure generally relates to condensation reduction treatments and, more specifically, to a method of reducing condensate on surfaces and structures and related compositions.

DESCRIPTION OF THE RELATED ART

Contamination is a critical concern at many industrial facilities, especially those involving food processing. Accordingly, many such facilities employ refrigeration equipment to reduce ambient temperatures, e.g. to reduce spoilage and/or contamination of food being processed. Unfortunately, however, industrial refrigeration equipment cannot adequately control humidity/moisture accumulation at typical processing temperatures (e.g. 40° F./4° C.), which is generally associated with the presence of hot water, moist carcasses, facility operators (i.e., warm-blooded mammals), cleaning/sanitation processes, processing steps involving heat, etc. This problem is compounded by the reduced capacity of cold air to absorb moisture (i.e., until the air is warmed, e.g. during shut-down and/or cleaning cycles). The accumulated moisture in the air can result in many problems, including compromising the integrity of the facility (e.g. via rotting wood, damaging structures, etc.) as well as the products being processed therein (e.g. via contamination with pathogenic and/or spoilage microorganisms, such as molds, yeasts, and bacteria), which may lead to reduced product quality, consumer illness and, in certain instances, product recalls.

In facilities such as meat processing plants, a sanitation cycle is often utilized during operation. These sanitation cycles often include an initial step of removing excess material(s) from various surfaces along the production line with pressurized hot water, which increases the effectiveness of later steps (e.g. foam cleaning, disinfecting, etc.) via removing excess proteins, lipids, etc. from the surfaces. Unfortunately, however, this use of hot water in the cool environment of the processing plant creates significant amounts of condensation. With regard to overhead surfaces in particular, which are generally cleaned less often than direct food contact surfaces on the production line, such condensation may result in contamination vectors via drops of condensate (e.g. containing absorbed bacteria, chemicals, etc.) falling onto food contact surfaces or onto food directly.

Typically, food processing facilities rely heavily on manual removal of condensate, especially concerning food contact surfaces, areas directly above processing lines, etc., which may be classified as "zone 1" and/or "zone 2" areas depending on proximity to the food being processed. Manual removal generally includes physically removing water droplets (e.g. from overhead surfaces) via mop, squeegee, etc. Unfortunately, however, manual removal is time and labor intensive and, while effective at removing overhead condensate, promotes spreading contaminates to adjacent surfaces, underlying food processing equipment, etc. via physically spreading condensate between surfaces and/or knocking contaminated droplets off the surface being wiped.

Recently, alternatives to manual removal have been increasingly utilized. For examples, some facilities utilize compressed air, films, etc. However, these alternatives suffer from their own disadvantages. For example, spraying high-velocity air at surfaces is useful for removing condensate and may lead to reduced labor/time needs, but also aerosolizes the water and associated contaminants across even larger distances than conventional techniques involving manual removal. Films, which are applied to overhead surfaces (e.g. to render surfaces hydrophobic) are typically cost-prohibitive, and suffer from disadvantages associated with installation, poor adhesion in high-humidity environments, need for frequent replacement due to deactivation over time, etc. As such, there exists a continuing need for cost-effective methods of mitigating issues associated with high-humidity environments, especially concerning condensation-associated contamination, cleaning procedures/processes, etc.

BRIEF SUMMARY OF THE INVENTION

A method of treating a surface is provided. The method includes disposing a condensation reduction composition on the surface, thereby treating the surface to reduce an amount of condensate and/or formation of condensate thereon. The condensation reduction composition comprises a surface-active agent comprising an alkyl polyglycoside. In certain embodiments, the condensation reduction composition further comprises a preservative, a pH control agent, and/or water.

A treated surface prepared in accordance with the method is also provided.

These and other features and advantages of the present disclosure will become apparent from the following description of particular embodiments, when viewed in accordance with the accompanying drawings and appended claims.

DETAILED DESCRIPTION OF THE INVENTION

Figure 1:
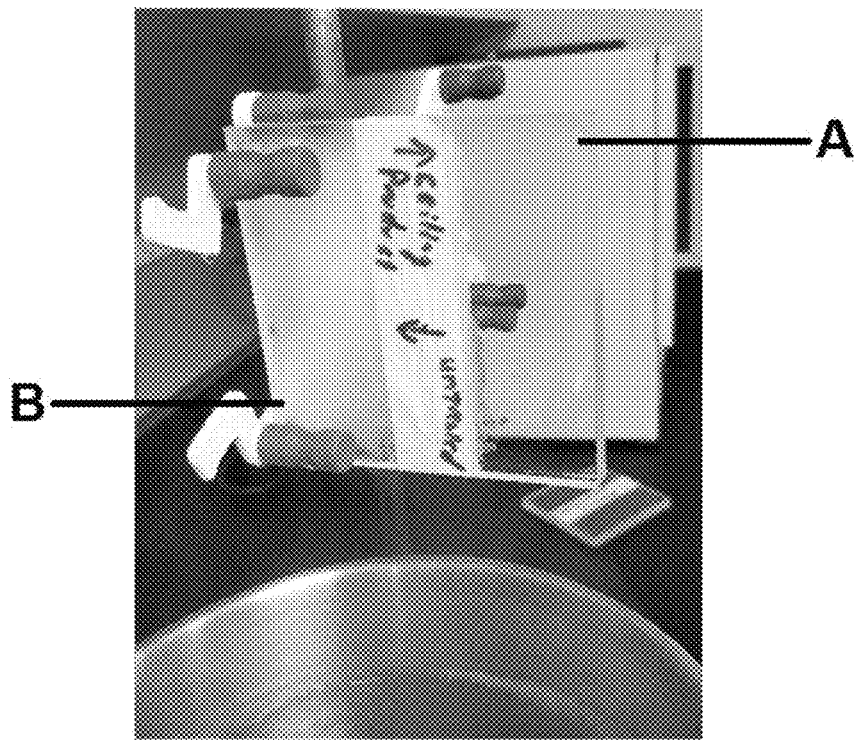
FIG. 1 shows an image of a polycarbonate plate prepared in Example 1 after exposure to a condensation condition, the plate having an untreated surface (B) adjacent a surface (A) treated with a condensation reduction composition in accordance with one embodiment of the disclosure.

A method of treating a surface (the "method") is provided. In general, the method is suitable for treating the surface to reduce an amount of condensate thereon, reduce or prevent formation of condensate on the surface (e.g. via condensation upon exposure to humidity), etc. As used herein, the terms "condensate" and "condensation" are used in the conventional sense, where the term "condensation" refers to the process by which water changes state from a vapor to a liquid (e.g. upon contact of the vapor with a solid object, typically of cooler temperature than the vapor, such as the surface), and the term "condensate" refers to water in a liquid state disposed on an object (e.g. the surface) via condensation. As will be appreciated from the description herein, the method may be utilized to treat surfaces utilized in diverse end-use applications, such as in production facilities (e.g. food processing facilities, etc.), commercial facilities (e.g. office buildings, public buildings, etc.), residential facilities (e.g. homes, dormitories, etc.), and the like. In these and other such applications, the method provides unique and particular advantages, including efficient and effective risk reduction through decreasing or preventing condensate dripping from overhead surfaces, thereby reducing or eliminating labor needs associated with manual condensate removal.

The method comprises disposing a condensation reduction composition (the "composition") on the surface.

The composition includes (A) a surface-active agent, as described in further detail below. However, the composition may comprise additional components, such as inactive, active, and/or adjuvant components, or may be combined with other components or formulations, depending on an intended use of the composition, as will be appreciated from the description below and as understood by one of skill in the art. For example, in certain embodiments, the composition further includes (B) a preservative and/or (C) a pH control agent.

The surface-active agent (A) comprises an alkyl polyglycoside, and is otherwise not particularly limited.

As understood by those of skill in the art, alkyl polyglycosides (i.e., APGs, sugar surfactants, etc.) are non-ionic surfactants typically derived from starches and fats or, further refined, from sugars (i.e., glucose) and fatty alcohols. As such, each alkyl polyglycoside typically comprises a glycone (i.e., a glycosidic sugar unit) and an aglycone (i.e., an alkyl group). When the glycone is a glucose, the alkyl polyglycoside is typically referred to as an alkyl polyglucoside.

In general, examples of alkyl polyglycosides suitable for use in, or as, the surface-active agent (A) have the general formula $[G]_x(OA)_yR^1$, where each [G] is a glycone, each A is an alkylene group, $R^1$ is an alkyl group, subscript x is from 1 to 20, and subscript y is from 0 to 20.

Typically, glycone [G] is selected from sugars and sugar derivatives, such as glucose, sucrose, xylose, sorbitan, etc. In certain embodiments, glycone [G] is selected from glucose and derivatives thereof, such that the include those derived from glucose such that the alkyl polyglycoside is an alkyl polyglucoside. As will be appreciated by those of skill in the art, subscript x represents the degree of polymerization/oligomerization (i.e., DP) of the polyglycoside. In general, subscript x is from 1 to 20. In certain embodiments, subscript x is from 1 to 5, alternatively from 1 to 3, alternatively of from 1.1 to 1.8, alternatively of from 1.2 to 1.6.

Each alkylene group A is independently selected in each moiety indicated by subscript y, and thus may be the same as or different from any other alkylene group A. In some embodiments, however, each alkylene group A is the same as each other alkylene group A. Examples of alkylene groups include methylene (i.e., —$CH_2$—), ethylene (i.e., —$(CH_2)_2$—), propylene, butylene, etc. As will be appreciated by those of skill in the art, subscript y represents the number of repeating alkylene oxide units in the ether/polyoxyalkylene unit AO. In general, subscript y is from 0 to 20. In some embodiments, subscript y is 0, such that the alkyl polyglycoside is free from, alternatively substantially free from, polyalkylene oxides. In other embodiments, subscript y is from 1 to 20, such as from 1 to 18, alternatively from 2 to 18, alternatively from 4 to 16.

$R^1$ is an alkyl group. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g., isopentyl, neopentyl, and/or tert-pentyl), hexyl, dodecyl, hexadecyl as well as branched saturated hydrocarbon groups having from 6 to 18 carbon atoms. The alkyl group of $R^1$ may be linear or branched, saturated or unsaturated, substituted or unsubstituted, etc. As will be understood by those of skill in the art, the term "substituted" describes hydrocarbon moieties where either one or more hydrogen atoms is replaced with atoms other than hydrogen (e.g. a halogen atom, such as chlorine, fluorine, bromine, etc.), a carbon atom within a chain of the hydrocarbon is replaced with an atom other than carbon (i.e., $R^1$ includes one or more heteroatoms, such as oxygen, sulfur, nitrogen, etc., within the chain), or both. As such, it will be appreciated that $R^1$ includes alkyl-containing hydrocarbon moieties that may have substituents in and/or on (i.e., appended to and/or integral with) carbon chains/backbones thereof, such that $R^1$ may comprise, or be, an ether, an amine, etc. Linear and branched alkyl groups may independently be saturated or unsaturated. One example of a combination of a linear and cyclic hydrocarbyl group is an aralkyl group. In certain embodiments, $R^1$ is a C6 to C22 alkyl group, alternatively a C8 to C16 alkyl group.

In certain embodiments, the surface-active agent (A) comprises more than one alkyl polyglycoside, such as 2, 3, 4, or more alkyl polyglycosides. In such embodiments, each alkyl polyglycoside is independently selected, and may be the same as or different from any other alkyl polyglycoside (e.g. with respect to alkyl chain length, glycone type, etc.). As understood by those of skill in the art, each alkyl polyglycoside may itself comprise a mixture of different alkyl polyglycosides. For example, in certain embodiments, the surface-active agent (A) comprises a C8-C16 alkyl polyglucoside, which, as will be understood by those of skill in the art in view of the description herein, is a mixture of alkyl polyglucosides having an alkyl group (e.g. $R^1$ in the general formula above) that includes 8 to 16 carbon atoms. As will also be understood by those of skill in the art, such mixtures of alkyl polyglycosides (e.g. alkyl polyglucosides) may be referred to in the singular form. As such, the alkyl polyglycoside of the surface-active agent (A) may likewise be referred to herein in the singular form, or in a plural form, or both (e.g. as the "alkyl polyglycoside(s)") interchangeably in accordance with the various embodiments described, such that the properties, characteristics, and/or limitations described above may apply to any one or more of the alkyl polyglycoside(s) selected.

The alkyl polyglycoside may be utilized in any form in the surface-active agent (A), such as neat (i.e., absent solvents, carrier vehicles, diluents, etc.), or disposed in a carrier vehicle, such as a solvent or dispersant. The carrier vehicle, if present, may comprise an aqueous solvent (e.g. water), an organic solvent (e.g. substituted or unsubstituted hydrocarbons, etc.). When utilized, the carrier vehicle will be selected based on the particular components of the composition and/or the surface-active agent (A), such as the particular alkyl polyglycoside selected. It will be appreciated that the alkyl polyglycoside may be combined with the carrier vehicle, if utilized, prior to, during, or after being combined with any other components of the surface-active agent (A). In certain embodiments, the surface-active agent (A) is free from, alternatively substantially free from carrier vehicles. Typically, however, the surface-active agent (A) comprises water.

The surface-active agent (A) may be present in the composition in any amount, which will be selected by one of skill in the art, e.g. dependent upon the particular component (A) selected, the presence and type/amount of any other components utilized in the composition, etc. For example, in some embodiments, the composition comprises the surface-active agent (A) in an amount of from 0.0005 to 100 wt. %, alternatively of from 0.07 to 30 wt. %, based on the total weight of the composition. In some such embodiments, the composition comprises the surface-active agent (A) in an amount of from 5 to 30 wt. %, such as from 10 to 30, alternatively from 10 to 25, alternatively from 10 to 20, alternatively of 13 to 16 wt. %, based on the total weight of the composition. Typically, the amount of surface-active agent (A) is selected based on the concentration of the alkyl polyglycoside therein. For example, in some embodiments, the composition comprises an amount of the surface-active agent (A) to comprise the alkyl polyglycoside in an amount of from 0.05 to 0.3 wt. %, such as from 0.1 to 0.3, alternatively from 0.1 to 0.25, alternatively from 0.1 to 0.2 wt. %, based on the total weight of the composition.

As introduced above, the surface-active agent (A) typically comprises water. Alternatively, or in addition, the composition itself typically comprises water. More specifically, in addition to the surface-active agent (A), and components (B) and (C) described below (when utilized), the composition typically comprises water in an amount sufficient to carry the components of the composition, e.g. as a solution. For example, in some embodiments, the composition comprises water in an amount of from 65 to 99.9 wt. %, based on the total weight of the composition. Of course, amounts outside these ranges may be utilized as well, and the composition may comprise water as a discreet component and/or from other components of the composition (e.g. the carrier vehicle of component (A), etc.).

In certain embodiments, the composition comprises the preservative (B). The preservative (B) is not generally limited, and may comprise, alternatively may be, any composition or compound suitable for preserving the composition (i.e., minimizing and/or preventing the composition from decomposition and/or live contamination, e.g. from microbial growth).

As will be understood by those of skill in the art, examples of preservatives suitable for use in or as the preservative (B) generally include, alternatively are, preservative compounds. Examples of preservative compounds generally include phenols, benzoic acids and benzoates, parabens, etc. Specific examples of preservative compounds include phenylethyl alcohols, phenoxyethyl alcohols, chlorobutanols, 4-hydroxybenzoic acids (e.g. 4-hydroxybenzoic acid methylester, propylester etc.), benzalkonium chlorides, p-chlorocresols, cetylpyridinium chlorides, chlorohexidines (e.g. chlorohexidine diacetate, gluconate, etc.), ethanol, propylene glycol, and the like, as well as derivatives, modifications, and combinations thereof. In some embodiments, the preservative (B) comprises, alternatively consists essentially of methyl paraben, propyl paraben, sodium hydroxymethylglycinate, potassium sorbate, caprylhydroxamicmic acid, phenoxyethanol, methylpropanediol, sodium benzoate, benzoic acid, sorbic acid, natamycin, calcium propionate, imidazolidinyl urea, isothiazolinone, methylisothiazolinone, methylchloroisothiazolinone, lactic acid, 1,3-bis(hydroxymethyl)-5,5-dimethylimidazolidine-2,4-dione (DMDM Hydantoin), 2-bromo-2-nitropropan-1,3-diol, phenol, or a combination thereof. In some embodiments, the preservative (B) comprises a preservative compound that comprises, alternatively is, sodium benzoate. In these or other embodiments, the preservative (B) comprises a preservative compound that comprises, alternatively is, a paraben, such as any of those described herein.

In certain embodiments, the preservative (B) comprises more than one preservative compound, such as 2, 3, 4, or more preservative compounds. In such embodiments, each preservative compound is independently selected, and may be the same as or different from any other preservative compound in the preservative (B) (e.g. in terms of structure, activity, mode of action, etc.). In particular embodiments, the preservative (B), alternatively the composition as a whole, comprises but one preservative compound. Regardless of whether the preservative (B) comprises but one preservative compound or more than one preservative compound, the preservative (B) is still referred to herein in the singular form for clarity.

The preservative (B) may be utilized in any form, such as neat (i.e., a combination of one or more preservative compounds in combination and absent solvents, carrier vehicles, diluents, etc.), or as a composition comprising one or more preservative compounds disposed in a carrier vehicle, such as a solvent or dispersant. The carrier vehicle, if present, may comprise an aqueous solvent, an organic solvent, etc., such as those described above. In some embodiments, the preservative (B) comprises water. When utilized, the carrier vehicle will be selected based on the particular components of the composition and/or the preservative (B), such as the particular preservative compound selected, the pH of the composition and/or the preservative (B), etc. It will be appreciated that any preservative compound of the preservative (B) may be combined with the carrier vehicle, if utilized, prior to, during, or after being combined with any other components of the preservative (B). In certain embodiments, however, the preservative (B) is free from, alternatively substantially free from carrier vehicles.

The preservative (B) may be present in the composition in any amount, which will be selected by one of skill in the art, e.g. dependent upon the particular components of the composition selected (i.e., the type/amount of (A), (B), (C) (if utilized), etc.). Typically, the amount of preservative (B) is selected based on the concentration of the preservative compound(s) therein. More specifically, the composition typically comprises an amount of the preservative (B) to comprise the preservative compound(s) thereof in an amount of from 0.001 to 5 wt. %, alternatively from 0.001 to 1 wt.

%, based on the total weight of the composition. In some embodiments, the composition comprises the preservative (B) in an amount of from 0.001 to 0.004 wt. %, such as from 0.001 to 0.003, alternatively from 0.0015 to 0.003, alternatively from 0.0015 to 0.0025 wt. %, based on the total weight of the composition. In other embodiments, the composition comprises the preservative (B) in an amount of from 0.1 to 0.4 wt. %, such as from 0.1 to 0.3, alternatively from 0.15 to 0.3, alternatively from 0.15 to 0.25 wt. %, based on the total weight of the composition.

In some embodiments, the composition is free from, alternatively substantially free from, a preservative, such as any one or more of the preservative compounds described above with respect to the preservative (B).

In certain embodiments, the composition comprises the pH control agent (C). The pH control agent (C) is not generally limited, and may comprise, alternatively may be, any composition or compound suitable for controlling, modifying, and/or buffering the pH of the composition. Examples of such compounds include hydroxides (e.g. sodium hydroxide, potassium hydroxide, calcium hydroxide, etc.), carbonates (e.g. citrates, acetates, oxalates, etc.), silicates, phosphates, sulfates, amines, borates, and the like, as well as derivatives, modifications, and combinations thereof. Additional examples of such compounds include chlorates, chlorites, nitrates, nitrites, phosphites, sulfites, thiosulfates, perchlorates, im ides, imidazoles, and the like, as well as derivatives, modifications, and combinations thereof. As will be understood by those of skill in the art, the pH control agent (C) typically comprises, alternatively is, an acid, a base, or a combination thereof.

Examples of bases suitable for use in or as pH control agent (C) include alkali metal hydroxides (e.g. sodium hydroxide, potassium hydroxide, etc.), carboxylates (e.g. conjugate bases of carboxylic acids, such as benzoate salts, citrate salts, etc.) carbonates (e.g. alkali metal carbonate salts such as sodium carbonate, etc.), phosphates, sulfonates, sulfates, and the like, as well as derivatives, modifications, and combinations thereof. Examples of acids suitable for use in or as pH control agent (C) include mineral acids (e.g. hydrochloric acid, phosphoric acid, sulfuric acid, etc.), organic acids (e.g. carboxylic acids, such as citric acid, etc.), inorganic acids (e.g. phosphonic acids, sulfonic acids, etc.) and the like, as well as derivatives, modifications, and combinations thereof. As will be appreciated by those of skill in the art, conjugate acids and/or bases of the compounds listed above may also be utilized in/as the pH controller (i.e., as acids and/or bases, respectively). For clarity, the term "pH controller" is used herein to describe the active compound(s) of the pH control agent (C) (e.g. the acid and/or base thereof). However, it is to be understood that the term "pH controller" is not limited to the singular form but instead equally applies to but one active compound of the pH control agent (C) (e.g. where the pH control agent (C) comprises only one active compound, such as an acid or a base) as well as to a mixture of more than one active compound of the pH control agent (C).

The pH controller may be utilized in the pH control agent (C) in any form, such as neat (i.e., a combination of one or more acids and/or bases in combination and absent solvents, carrier vehicles, diluents, etc.), or disposed in a carrier vehicle, such as a solvent or dispersant. The carrier vehicle, if present, may comprise an aqueous solvent, an organic solvent, etc., such as those described above. In some embodiments, the pH control agent (C) comprises water. When utilized, the carrier vehicle will be selected based on the particular components of the composition and/or the pH control agent (C), such as the particular pH controller selected, the desired pH of the composition and/or the pH control agent (C), etc. It will be appreciated that the pH controller, or the components thereof (e.g. any acid(s) and/or base(s) present in the pH controller), may be combined with the carrier vehicle, if utilized, prior to, during, or after being combined with any other components of the pH control agent (C). In certain embodiments, however, the pH control agent (C) is free from, alternatively substantially free from carrier vehicles.

The pH control agent (C) may be present in the composition in any amount, which will be selected by one of skill in the art, e.g. dependent upon the particular components of the composition selected (i.e., the type/amount of component (A), component (B) (if utilized), etc.). Typically, the amount of pH control agent (C) is selected based on the concentration and composition of the pH controller and the desired pH of the composition as a whole. In general, the composition may be formulated (i.e., with components (A), (B), and/or (C)) to comprise a pH of from 0.5 to 12.5, alternatively from 2 to 12.5. For example, in some embodiments, the composition comprises an amount of the pH control agent (C) to provide the composition with a pH of from 0.5 to 8, such as from 1 to 7, alternatively from 1 to 4, alternatively from 2.5 to 4. In other embodiments, the composition comprises an amount of the pH control agent (C) to provide the composition with a pH of from 7 to 12.5, such as from 7 to 12, alternatively from 7 to 11, alternatively from 7 to 10, alternatively from 7 to 9.

In these or other embodiments, the composition comprises an amount of the pH control agent (C) in an amount of from 0.01 to 6 wt. %, based on the total weight of the composition. In some embodiments, the composition comprises an amount of the pH control agent (C) in an amount of from 0.01 to 0.05 wt. %, such as from 0.01 to 0.04, alternatively from 0.015 to 0.035, alternatively from 0.02 to 0.03 wt. %, based on the total weight of the composition. In other embodiments, the composition comprises an amount of the pH control agent (C) in an amount of from 1 to 5 wt. %, such as from 1 to 4, alternatively from 1.5 to 3.5, alternatively from 2 to 3 wt. %, based on the total weight of the composition.

In certain embodiments, the pH control agent (C) comprises more than one pH controller, such as 2, 3, 4, or more of the acids and/or bases described herein. In such embodiments, each pH controller is independently selected, and may be the same as or different from any other pH controller in the pH control agent (C) (e.g. in terms of structure, activity, pKa/pKb, etc.). For example, in specific embodiments, the pH control agent (C) comprises a basic pH controller (C1) and an acidic pH controller (C2). In such embodiments, (C1) and (C2) are typically selected to complement each other in the pH control agent (C). For example, in some such embodiments, (C1) comprises, alternatively is, sodium citrate and (C2) comprises, alternatively is, citric acid. In these embodiments, the amounts described above with respect to the pH control agent (C) may apply to each of (C1) and (C2) individually, or collectively with respect to the combined amount of (C1) and (C2) present in the composition. In some embodiments, the composition comprises the sodium citrate (C1) in an amount of from 0.0003 to 0.1 wt. % and the citric acid (C2) in an amount of from 0.01 to 5 wt. %, each based on the total weight of the composition.

Any or all of components of the composition (e.g. component(s) (A), (B), and/or (C)) may be prepared, purchased from various commercial suppliers, or otherwise obtained.

In certain embodiments, the method comprises preparing component(s) (A), (B), and/or (C). In such embodiments, preparing any one or more of the components may be performed prior to use of the component in the composition (i.e., preformation) or, alternatively, in the composition itself (e.g. in situ) by combining compound of the component together in the composition. For example, in certain embodiments, the method comprises preparing the surface-active agent (A) by combining the alkyl polyglycoside with the carrier vehicle. In some such embodiments, the alkyl polyglycoside is combined with the carrier vehicle in the composition (e.g. in the presence of component (B) and/or (C), etc.). In other such embodiments, the alkyl polyglycoside is combined with the carrier vehicle to preform component (A), which is subsequently combined with the other components of the composition.

In some embodiments, the composition comprises one or more additional components (i.e., additives), such as a thickener, a filler, a coloring agent, a viscosity modifier, or combinations thereof. In general, the composition is formulated based on a desired use thereof, further processing and/or compounding to be performed, etc. As such, the amount of each additive, when utilized, will be independently selected by those of skill in the art, e.g. in view of a desired end use of the composition, the nature/type of other additives to be utilized, etc. Each additive may be utilized in any form, such as neat (i.e., absent solvents, carrier vehicles, diluents, etc.), or disposed in a carrier vehicle, such as those described above (e.g. selected based on the particular additive, the other components of the oral care composition, etc.). It will be appreciated that any one additive may be combined with the carrier vehicle, if utilized, prior to, during, or after being combined with any other components of the composition. Likewise, each additive may be combined with any other additive or component of the composition, prior to, during, or after being combined with any other components of the composition.

In certain embodiments, the method comprises preparing the composition. In general, preparing the composition comprises combining together the components thereof (e.g. the surface active agent (A), the preservative (B), the pH control agent (C), etc.). In some embodiments, the components of the composition are combined in a vessel to prepare the composition. However, the components may be combined on the surface or during disposition onto the surface, i.e., such that the method comprises preparing the composition in situ on the surface. The components are typically combined together at room temperature, however, the vessel may be heated or cooled in any suitable manner during combining of any or all of the components (e.g. via a jacket, mantle, exchanger, bath, coils, etc.). The components may be fed together or separately to the vessel, or may be disposed in the vessel in any order of addition, and in any combination. For example, in certain embodiments, components (B) and (C) are added to a vessel containing component (A). In such embodiments, components (B) and (C) may be first combined prior to the addition, or may be added to the vessel sequentially (e.g. (C) then (B)). In general, reference to the "component mixture" herein refers generally to a mixture comprising components (A), (B), and (C) (e.g. as obtained by combining such components, as described above). The method may further comprise agitating the component mixture. The agitating may comprise any mixing, blending, and/or agitating techniques known in the art, and is generally utilized to homogenize the component mixture to prepare the composition.

Typically, the components of the composition are combined in the presence of a carrier vehicle or solvent, such as one or more of those described above. For example, portions of the carrier vehicle or solvent may be added to or otherwise combined with the any of components (A), (B), and/or (C) discretely, collectively with mixtures of components (A), (B), and/or (C), or with the reaction mixture as a whole. In certain embodiments, at least a portion of the carrier vehicle is disposed into the vessel prior to combining the components therein. The total amount of carrier vehicle/solvent present in the component mixture will be selected by one of skill in the art, e.g. based on the particular component (A), (B), and/or (C) selected, the reaction parameters employed, etc. In some embodiments, the carrier vehicle is water, and the components are combined in the presence of the water and mixed to prepare the composition as an aqueous solution.

The composition may be provided in any form, such as in the form of a solution (e.g. the aqueous solution described above), a spray, an aerosol, a foam, a gel, or the like, or any combination thereof.

In general, disposing the composition on the surface may be carried out using any technique known in the art for applying a composition to a surface. As such, disposing the composition may be further defined as applying the composition to the surface. Examples of suitable application techniques include spraying, brushing, mopping, etc., and may be carried out by hand or via machine, using brushes, sponges, sprayers (e.g. trigger sprayers, pressure sprayers, etc.), foamers (e.g. tank foamers, wall foamers, etc.), pressure washers, aerosol applicators, and the like, or combinations thereof. The particular application technique(s) will be selected by those of skill in the art, e.g. in view of the form of the composition, the surface on which the composition is to be applied, etc.

The composition may be applied to any surface, comprising natural and/or synthetic materials, such that the surface of the method is not particularly limited. Typically, the composition is applied to a non-textile surface, such as those presented by structures comprising metals, ceramics, glasses, stone, resins, concretes, etc., or combinations thereof. However, the surface can be continuous or discontinuous, smooth or textured, porous or non-porous, etc. In certain embodiments, the surface is water-absorbing. In some such embodiments, the surface is presented by a structure comprising a water absorbing concrete. In certain embodiments, the composition is applied to an overhead surface, i.e., a surface of a structure disposed above an area at a height sufficient for a person to stand and/or sit underneath. The surface may be a horizontal surface, a vertical surface, etc. Typically, the composition is applied to a surface on which moisture may otherwise condense onto, form droplets, and run and/or drip off. As will be understood by those of skill in the art, such surfaces are generally presented by various structures common to industrial facilities, including ceilings, walls, windows, ductwork, piping, tubes, cables, panels, blades, etc. It is also to be understood that the term "surface" is not limited to but a single surface, but instead also encompasses multiple adjacent/adjoining surfaces that form a single structure. Likewise, the method may include disposing (e.g. applying) the composition to multiple surfaces.

As will be understood in view of the description herein, the method prepares a treated surface, i.e., a composite article comprising the surface and the composition disposed on the surface. It will be appreciated that the particular formulation of the composition once disposed on the surface may change over time via evaporative loss (e.g. of the carrier vehicle), dilution (e.g. via absorption of water from atmospheric moisture or condensate, etc.), especially upon exposure of the treated surface to certain atmospheric conditions common to industrial facilities (e.g. strong air-flow from HVAC systems, temperature fluctuations, humidity fluctuations, etc.), typical cleaning processes, etc. As such, the method may comprise repeatedly disposing the composition on the surface over time, such as in regular or random intervals, upon cessation or reduction in the effectiveness of the treatment, etc. For example, in some embodiments, the method comprises applying the composition to the surface after regular cleaning intervals, e.g. during normal operation of the facility.

As introduced above, the method comprising treating the surface to reduce an amount of condensate thereon. In general, the reduction in condensate may be defined or otherwise described as a reduction in the formation and/or accumulation of condensate on the treated surface over a period of time (e.g. from 1 min to 2 weeks, alternatively from 1 min to 1 week) as compared to the surface (i.e., untreated) under substantially the same conditions. In certain embodiments, the reduction in condensate may be defined or otherwise described as a reduction in the formation and/or accumulation of condensate on the treated surface, as compared to the surface (i.e., untreated) under substantially the same conditions, over a period of time of from 1 min to 170 hr, alternatively from 1 min to 150 hr, alternatively from 5 min to 120 hr, alternatively from 10 min to 96 hr, alternatively from 10 min to 78 hr. This reduction can be observed or measured in numerous ways, as will be understood by those of skill in the art. As will also be understood by those of skill in the art, the reduction is typically observed during exposure of the surface to a condensation condition (i.e., atmospheric moisture from relatively high-humidity environments, water vapor at a higher temperature than the surface, etc.).

For example, in some embodiments, reducing the amount of condensate on the surface comprises reducing the number of condensate drops falling from the surface (i.e., drippage) during exposure of the surface to a condensation condition. In these or other embodiments, reducing the amount of condensate on the surface comprise increasing the rate of condensate evaporation on the surface during exposure to a condensation condition. In these or other embodiments, reducing the amount of condensate on the surface comprises decreasing the rate of condensation, i.e., the rate of condensate formation, on the surface during exposure to a condensation condition. In these or other embodiments, reducing the amount of condensate on the surface comprises increasing the rate of water absorption through the surface, thereby reducing the amount of water on the surface during exposure to a condensation condition. In all such embodiments, the reduction may be defined, or otherwise described, as a relative comparison of the treated surface and the untreated surface (i.e., pre-treatment) upon exposure to the same condensation condition(s).

In some embodiments, the method further comprises exposing the treated surface to a condensation condition, such as one or more of those described above. In such embodiments, the method may comprise exposing the treated surface to the condensation condition after preparing the treated surface, i.e., introducing the condensation condition only subsequent to disposing the composition on the surface. In some embodiments, however, the method may comprise exposing the surface to the condensation condition concurrently with disposing the composition thereon, such that the method comprises preparing the treated surface in the presence of the condensation condition. In certain embodiments, the method comprises both preparing the treated surface in the presence of the condensation condition and also exposing the treated surface to the condensation condition (i.e., post-preparation).

It is to be appreciated that the composition of the present embodiments is distinguished from a cleaning/disinfecting composition, as will be understood in view of the purpose, effects, and features of the method described herein. As such, in some embodiments, the method is substantially free from, alternatively free from, discreet cleaning steps (i.e., actions involving cleaning the surface, other than incidentally via applying the composition thereto). In specific embodiments, the method is utilized as an adjunctive process during normal operation of the facility, e.g. in addition to cleaning processes.

As will be understood by those of skill in the art, this disclosure provides, in first embodiment, a method of treating a surface to reduce condensate and/or formation of condensate thereon, wherein said method comprises: disposing a condensation reduction composition on the surface, where the condensation reduction composition comprises (A) a surface-active agent comprising an alkyl polyglycoside, thereby treating the surface to reduce formation of condensate and/or an amount of condensate thereon.

In a second embodiment, the method of the first embodiment is further characterized by the condensation reduction composition comprising the surface-active agent (A) in an amount of from 0.0005 to 100 wt. %, based on the total weight of the condensation reduction composition.

In a third embodiment, the method of the first or second embodiment is further characterized by the surface-active agent (A) comprising a C8-C16 alkyl polyglucoside.

In a fourth embodiment, the method of the third embodiment is further characterized by the condensation reduction composition comprising the C8-C16 alkyl polyglucoside in an amount of from 0.07 to 30 wt. %, based on the total weight of the condensation reduction composition.

In a fifth embodiment, the method of any one of the first through the fourth embodiments is further characterized by the condensation reduction composition comprising (B) a preservative.

In a sixth embodiment, the method of the fifth embodiment is further characterized by the preservative (B): (i) comprising sodium benzoate; (ii) being present in the condensation reduction composition in an amount of from 0.001 to 1 wt. %, based on the total weight of the condensation reduction composition; or (iii) both (i) and (ii).

In a seventh embodiment, the method of the fifth or sixth embodiment is further characterized by the preservative (B) being present in the condensation reduction composition in an amount of from 0.001 to 0.4 wt. %, based on the total weight of the condensation reduction composition:

In an eighth embodiment, the method of any one of the first through seventh embodiments is further characterized by the condensation reduction composition comprising a pH of from 2.0 to 12.5.

In a ninth embodiment, the method of any one of the first through eighth embodiments is further characterized by the condensation reduction composition comprising a pH of from 7.9 to 8.1.

In a tenth embodiment, the method of any one of the first through ninth embodiments is further characterized by the condensation reduction composition further comprising (C) a pH control agent.

In an eleventh embodiment, the method of tenth embodiment is further characterized by the condensation reduction composition comprising the pH control agent (C) in an amount of from 0.01 to 6 wt. %, based on the total weight of the condensation reduction composition.

In a twelfth embodiment, the method of the tenth or eleventh embodiment is further characterized by the pH control agent (C) comprising: (C1) sodium citrate; (C2) citric acid; or both (C1) and (C2).

In a thirteenth embodiment, the method of the twelfth embodiment is further characterized by the pH control agent (C) comprising the sodium citrate (C1), where the sodium citrate (C1) is present in the condensation reduction composition in an amount of from 0.0003 to 0.1 wt. %, based on the total weight of the condensation reduction composition.

In a fourteenth embodiment, the method of the twelfth or thirteenth embodiment is further characterized by the pH control agent (C) comprising the citric acid (C2), where the citric acid (C2) is present in the condensation reduction composition in an amount of from 0.01 to 5 wt. %, based on the total weight of the condensation reduction composition.

In a fifteenth embodiment, the method of any one of the first through fourteenth embodiments is further characterized by the condensation reduction composition comprising water in an amount of from 65 to 99.9 wt. %, based on the total weight of the condensation reduction composition.

In a sixteenth embodiment, the method of any one of the first through fifteenth embodiments is further characterized by the method further comprising: (i) preparing the condensation reduction composition prior to disposing the condensation reduction composition on the surface; (ii) preparing the condensation reduction composition on the surface; or (iii) both (i) and (ii).

In a seventeenth embodiment, the method of any one of the first through sixteenth embodiments is further characterized by the condensation reduction composition being disposed on the surface as: (i) a spray; (ii) an aerosol; (iii) a solution; (iv) a foam; or (v) any combination of (i)-(iv).

In an eighteenth embodiment, the method of any one of the first through seventeenth embodiments is further characterized by disposing the condensation reduction composition on the surface comprising applying the condensation reduction composition to the surface via: (i) spraying; (ii) brushing; (iii) mopping; or (iv) any combination of (i)-(iii).

In a nineteenth embodiment, the method of any one of the first through eighteenth embodiments is further characterized by the surface being further defined as an overhead surface.

In a twentieth embodiment, the method of any one of the first through nineteenth embodiments is further characterized by the method comprising: (i) exposing the surface to a condensation condition subsequent to disposing the condensation reduction composition on the surface: (ii) exposing the surface to a condensation condition concurrently with disposing the condensation reduction composition on the surface; or (iii) both (i) and (ii).

In a twenty first embodiment, the method of any one of the first through twentieth embodiments is further characterized by reducing the amount of condensate and/or formation of condensate on the surface comprising: (i) reducing the number of condensate drops falling from the surface during exposure to a condensation condition; (ii) increasing the rate of condensate evaporation on the surface during exposure to a condensation condition; (iii) increasing the rate of water absorption into or through the surface; or (iv) any combination of (i)-(iii).

This disclosure also provides, in a twenty second embodiment, a treated surface prepared in accordance with the method of any one of the first through twenty first embodiments.

It is to be appreciated that the preceding embodiments, while enumerated in a sequential order, are not exhaustive of the scope of the this disclosure but are instead to be understood to be exemplary embodiments that may be combined, modified, and/or supplemented with any of the embodiments described herein. To further illustrate the embodiments of this disclosure, examples are provided below. These examples will also be understood as illustrative, and not limiting, with respect to the invention.

Certain components utilized in the Examples are set forth in Table 1 below.

TABLE 1

| Compounds Utilized in Example 1 and Comparative Examples 1-3 | |
|---|---|
| Component | Description |
| Surface-Active Agent (A1) | C8-C16 alkyl polyglucoside |
| Surface-Active Agent (A2) | Dioctyl sulfosuccinate |
| Surface-Active Agent (A3) | Cationically modified acrylate copolymer; cationic ampholytic surfactant |
| Surface-Active Agent (A4) | Modified acrylate polymer; catationic ampholytic terpolymer |
| Surface-Active Agent (A5) | Polyoxyethylene (20) sorbitan monooleate (polysorbate 80); non-ionic surfactant |
| Surface-Active Agent (A6) | Mixed C12/C14/C16 n-alkyl dimethyl benzyl ammonium chlorides and n-octyl decyl, di-n-octyl, and di-n-decyl dimethyl ammonium chlorides; quaternary ammonium chloride-based cationic surfactant |
| Preservative (B1) | Sodium benzoate |
| Preservative (B2) | Methyl paraben |
| Preservative (B3) | Propyl paraben |
| pH Control Agent (C1) | Sodium citrate |
| pH Control Agent (C2) | Citric acid |
| Carrier Vehicle (D) | Water |

General Preparation Procedure

A Carrier Vehicle is added to a mixing vessel at room temperature with mixing. The vessel is then charged, sequentially, with a Surface-Active Agent, a pH Control Agent, and a Preservative to give a component mixture, which is then stirred until all components are dissolved for (~30 min to 8 hr) to give a condensation reduction composition. Dissolution times are varied based on the preservative selected, with Preservative B1 providing relatively shorter times to dissolve (e.g. ~30 min), and Preservatives B2 and B3 providing comparatively longer times to dissolve (e.g. up to ~8 hr).

PREPARATION EXAMPLE 1

Formulations 1-8

Various condensation reduction compositions are prepared according to the General Preparation Procedure set forth above to give Formulations 1-8, the particular components and parameters of which are set forth in Table 2 below:

TABLE 2

Components of Formulations 1-8

| Component | Formulation 1 | 2 | 3 | 4 | 5 | 6 | 7 | 8 |
|---|---|---|---|---|---|---|---|---|
| Surface-Act. Agt. (A1): | 14.5 | — | — | — | — | — | 14.5 | 14.5 |
| Surface-Act. Agt. (A2): | — | 14.5 | — | — | — | — | — | — |
| Surface-Act. Agt. (A3): | — | — | 14.5 | — | — | — | — | — |
| Surface-Act. Agt. (A4): | — | — | — | 14.5 | — | — | — | — |
| Surface-Act. Agt. (A5): | — | — | — | — | 14.5 | — | — | — |
| Surface-Act. Agt. (A6): | — | — | — | — | — | 14.5 | — | — |
| Preservative (B1) | 0.2 | 0.2 | 0.2 | 0.2 | — | — | — | — |
| Preservative (B2) | — | — | — | — | — | — | — | 0.2 |
| Preservative (B3) | — | — | — | — | — | — | — | 0.1 |
| pH Control Agt. (C1): | 0.06 | 0.06 | 0.06 | 0.06 | 0.5 | 0.5 | 0.5 | 0.5 |
| pH Control Agt. (C2): | 2.55 | 2.55 | 2.55 | 2.55 | 0.22 | 0.22 | 0.22 | 0.22 |
| Carrier Vehicle (D): | 82.69 | 82.69 | 82.69 | 82.69 | 84.78 | 84.78 | 84.78 | 84.48 |
| Total (wt. %): | 100 | 100 | 100 | 100 | 100 | 100 | 100 | 100 |

EXAMPLE 1 and COMPARATIVE EXAMPLES 1-3

Small Scale Condensation Reduction

Condensation reduction compositions from Preparation Example 1 are assessed for efficacy in reducing an amount of condensate on a surface. In particular, a solution of each of Formulations 1-4 (1% in water, wt./wt.) is applied via trigger sprayer to half of a surface of a plate (polycarbonate square, 4"×4") to give a treated surface disposed adjacent an untreated surface. The plate is then subjected to a condensation condition by suspending the plate in a vapor stream over a pot of boiling water. After a time (T), each plate is visually inspected to compare the presence/amount of condensate between the treated and untreated surfaces/halves. The results of the assessment are set forth in Table 3 below, where a positive result indicated by a "yes" indicates a visual reduction in the amount of condensate on the treated surface compared to the untreated surface of each plate.

TABLE 3

Efficacy of Condensation Reduction Compositions

| | | Condensate Reduction Observed | |
|---|---|---|---|
| Example | Formulation | Time (T) = 1 min | Time (T) = 2 min |
| Ex. 1 | 1 | Yes | Yes |
| Comp. Ex. 1 | 2 | No | No |
| Comp. Ex. 2 | 3 | No | No |
| Comp. Ex. 3 | 4 | No | No |

An image of the polycarbonate plate treated with the condensation reduction composition of Formulation 1 in Example 1, after exposure to the condensation condition, is shown in FIG. 1. As shown, the method reduces the amount of condensate on the surface (A) treated with the condensation reduction composition during exposure to the condensation condition, as compared to the untreated surface (B).

EXAMPLES 2-4

Reducing Condensation on Surfaces of Varying Materials

Condensation reduction compositions from Preparation Example 1 are assessed for efficacy in reducing an amount of condensate on various surface types. In particular, a solution of Formulation 1 (1% in water, wt./wt.) is applied via trigger sprayer to a surface of a sheet (2'×4' sheet of material (M)) to give a treated surface. The sheet is then disposed adjacent an untreated sheet of the same type, and the pair of sheets then subjected to the condensation condition via the procedure described for the polycarbonate plate prepared in Example 1 above. After a time (T), each sheet is visually inspected to compare the presence/amount of condensate between the treated and untreated sheets of each pair. The results of the assessment are set forth in Table 4 below, where a positive result indicated by a "yes" indicates a visual reduction in the amount of condensate on the treated surface compared to the untreated surface of each plate.

TABLE 4

Efficacy of Condensation Reduction Composition of Formulation 1 on Various Surface Materials

| | | Condensate Reduction Observed | | |
|---|---|---|---|---|
| Example | Material (M) | Time (T) = 1 min | Time (T) = 2 min | Time (T) = 2 hr |
| Ex. 2 | White glassboard | Yes | Yes | Yes |
| Ex. 3 | Black glassboard | Yes | Yes | Yes |
| Ex. 4 | Stainless steel | Yes | Yes | Yes |

Figure 2A:
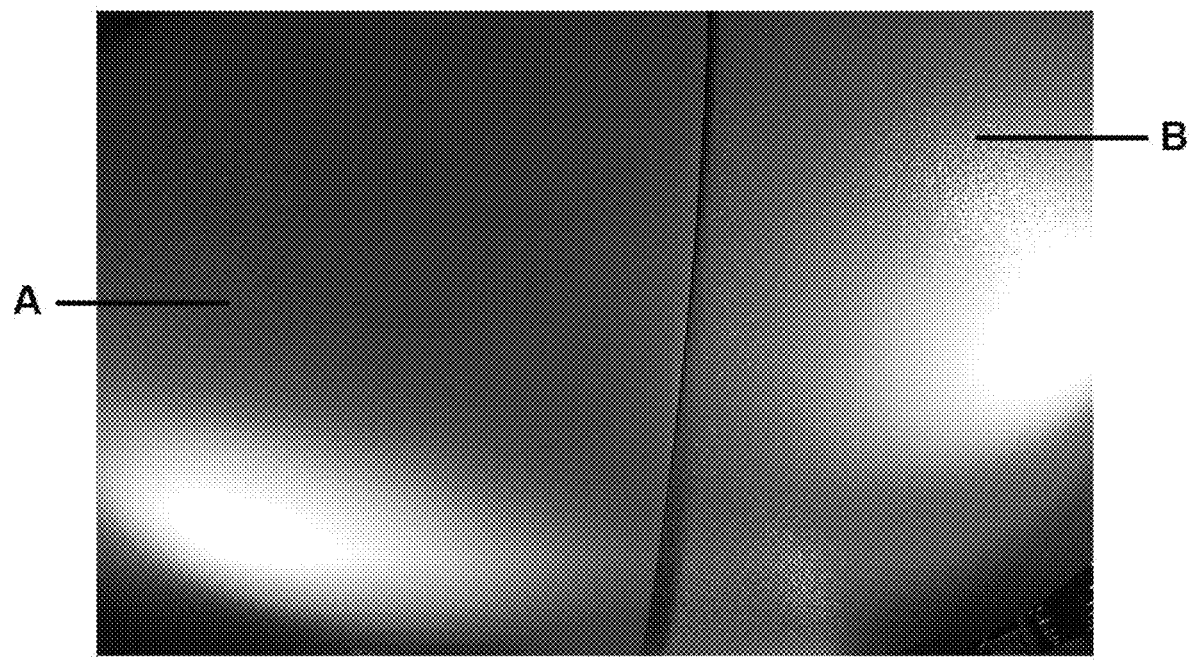
FIG. 2A shows an image of a pair of sheets prepared in Example 2 after exposure to a condensation condition, the pair including one sheet of white glassboard having an untreated surface (B) next to another sheet of white glassboard having a surface (A) treated with a condensation reduction composition in accordance with one embodiment of the disclosure.
Figure 2B:
FIG. 2B shows an image of a pair of sheets prepared in Example 3 after exposure to a condensation condition, the pair including one sheet of black glassboard having an untreated surface (B) next to another sheet of black glassboard having a surface (A) treated with a condensation reduction composition in accordance with one embodiment of the disclosure.
Figure 2C:
FIG. 2C shows an image of a pair of sheets prepared in Example 4 after exposure to a condensation condition, the pair including one stainless steel sheet having an untreated surface (B) next to another stainless steel sheet having a surface (A) treated with a condensation reduction composition in accordance with one embodiment of the disclosure.
Figure 3:
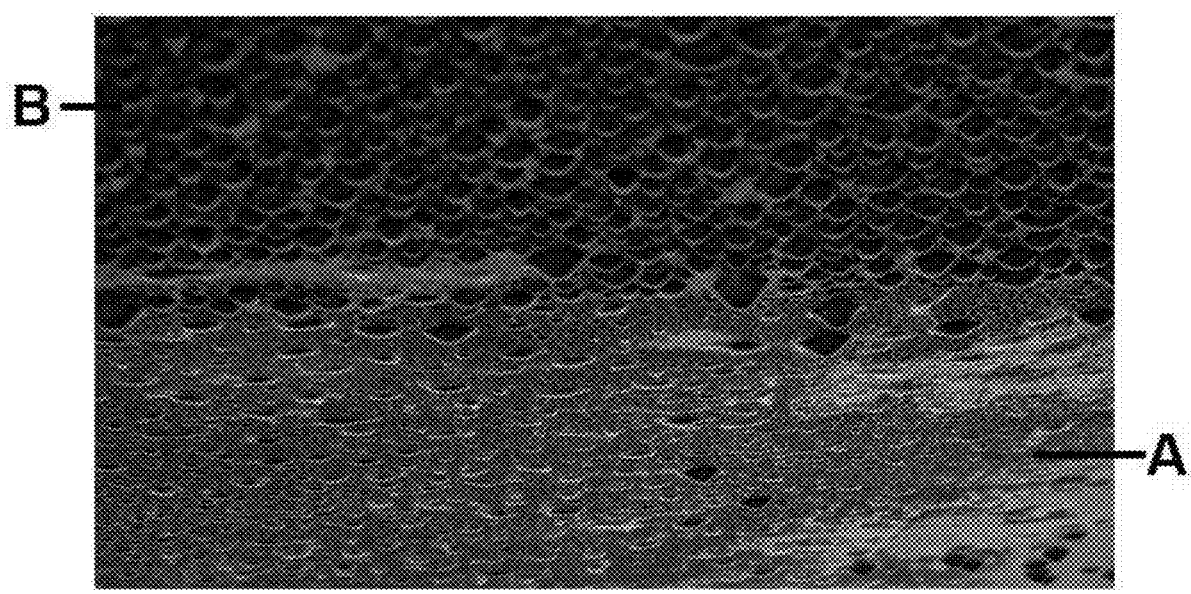
FIG. 3 shows a close-up image of a pair of black glassboard sheets prepared in Example 6 after exposure to a condensation condition, the pair including one sheet of black glassboard having an untreated surface (B) next to another sheet of black glassboard having a surface (A) treated with a condensation reduction composition in accordance with one embodiment of the disclosure.

Images of each pair of sheets from Examples 2-4 are shown in FIGS. 2A-2C, respectively. In particular, FIG. 2A shows the treated surface (A) and the untreated surface (B) of the white glassboard sheets, FIG. 2B shows the treated surface (A) and the untreated surface (B) of the black glassboard sheets, and FIG. 2C shows the treated surface (A) and the untreated surface (B) of the stainless steel sheets, each after exposure to the condensation condition. As shown, the method reduces the amount of condensate on the surfaces (A) of varying materials treated with the condensation reduction composition during exposure to the condensation condition, as compared to untreated surfaces (B) of the same materials exposed to the same condensation condition.

EXAMPLE 5

Reducing Condensation on Water-Absorbing Surface

Condensation reduction compositions from Preparation Example 1 are assessed for efficacy in reducing an amount of condensate on the surface of a water-absorbing material. In particular, a pair of concrete blocks are placed over a water bath. A solution of Formulation 8 (3 oz/gal in water, v./v.) is applied via trigger sprayer to the surface of one of the concrete blocks to give a treated surface. Both blocks are simultaneously subjected to a condensation condition by heating the bath to boiling for 1 hour to generate steam. The bath is then removed, and the concrete blocks allowed to dry under observation (video recording) for a time (T) of 24 min.

At T=1 min, the untreated surface is wet and includes numerous condensate droplets suspended therefrom; the treated surface is moist (evidenced by dark-gray coloration) without visible water droplets. At T=5 min, portions of the untreated surface begin to dry (evidenced by a return to native light-gray coloration) while some condensate droplets remain suspended from other portions; the treated surface is rapidly drying, with ~30% returned to native coloration. At T=15 min, no visible condensate droplets remain on the untreated surface, ~50% of which has returned to native coloration; the treated surface continues to rapidly dry, with >90% returned to native coloration At T=24 min, the treated surface appears dry with no dark/moist spots visible, while ~25% of the untreated surface appears dark/moist.

EXAMPLE 6

Large Scale Condensation Reduction

Condensation reduction compositions from Preparation Example 1 are assessed for efficacy in reducing an amount of condensate over a large-area surface. In particular, a pair of large black glassboard sheets (2'×4') supported at the edges of the short ends are placed side-by-side and suspended face-down over a drum filled with water. A solution of Formulation 1 (3 oz/gal in water, v./v.) is applied via trigger sprayer to the bottom surface (face) of one of the sheets to give a treated surface over the drum. Both sheets are simultaneously subjected to a condensation condition by continuously flowing heated water into the drum to create steam below the treated and untreated sheet surfaces. The entire apparatus thus prepared is covered with a tarp, and the sheets steamed for 1 hour. The bath is then removed, a light is obliquely directed onto each of the treated and untreated sheet surfaces to aid in observing condensation/drying effects, and the sheets allowed to dry under observation (video recording) for a time (T) of 2 hours.

At T=5 min, the untreated surface is uniformly covered with condensate droplets suspended therefrom; the treated surface also contains condensate droplets, but demonstrates more sheeting and wetting. This effect remains throughout the 2 hour observation period, with the treated surface continuously presenting smaller and less numerous condensate droplets and drippage. A close-up image of the treated surface (A) and the untreated surface (B) of the pair of black glassboard sheets is shown in FIG. 4. As shown by the comparison of the treated surface (A) to the untreated surface (B), the composition and method reduces the amount of condensate on the surface over time, even across a large surface area.

EXAMPLE 7

Field Test, Foaming Application

A solution of Formulation 1 (3 oz/gal in water, v./v.) is prepared in a pressurized foam sprayer (Internal Tank Foamer, Model #925937, Lafferty Equipment Manufacturing, Inc., AR, USA) to give a condensation reduction composition, which is then sprayed on to a portion of a concrete ceiling of a room in a meat processing facility, taking care to leave an adjacent portion of the ceiling untreated as a control. The room is then cleaned for two hours using pressurized hot water (room temperature ~33° C., with 100% relative humidity) creating fog in the room. At the end of the cleaning cycle, the ceiling is sprayed with the hot water and then allowed to dry under observation (video recording) for a time (T) of 2.5 hours, during which time the room quickly cools to ~8° C. with 40% relative humidity.

During the observation window, water (condensate) on the treated surface is observed spreading and running off the surface, while the condensate on the untreated surface agglomerates and forms into beads. At T=1.5 hr, condensate droplets are clearly visible suspended from the untreated surface, forming rivulets and dropping from the ceiling; the condensate on the treated surface sheets into a thin film with no further dripping observed, and the treated surface begins to dry (evidenced by a return to native light-gray coloration). At T=2.5 hr, the untreated surface contains rivulets of condensate and continues to drip; the treated surface shows little to no sign of remaining condensate and continues to dry rapidly, with >90% returned to native coloration.

EXAMPLE 8

Field Test, Liquid Application Post-Condensate Formation

A solution of Formulation 1 (3 oz/gal in water, v./v.) is prepared in a plastic handheld pump sprayer (e.g. SureSpray Deluxe Sprayer, Model #26030, Chapin International, NY, USA) to give a condensation reduction composition, which is then sprayed on to a portion of a concrete ceiling of a room housing HVAC equipment in a meat possessing facility, taking care to leave an adjacent portion of the ceiling untreated as a control. Adjoining rooms in the processing facility are then cleaned for two hours using pressurized hot water (room temperature ~33° C., with 100% relative humidity), leading to fog formation in the room. The ceiling was not sprayed with water during the cleaning process. After the cleaning was complete, the fog was allowed to dissipate and the ceiling allowed to dry under observation (video recording) for a time (T) of 2.5 hours. At T=1 hr, the treated surface was spotted with dark/wet spots, while the untreated surface was uniformly covered in condensate droplets. At T=2.5 hours, the treated surface was nearly dry, while the untreated surfaces in the room remained wet and still held condensate droplets.

EXAMPLE 9 and Comparative Examples 4-7: Drip Test

A simulated meat-packing plant environment is created to quantify the benefit provided by the method and condensation reduction composition. In particular, a building model was constructed by epoxying concrete paving stones along the length of a wooden board to create a ceiling panel, stacking concrete blocks (cinder blocks) to form two opposing side walls, and supporting the ends of the boards on the side walls to suspend the ceiling panels concrete-side down over the ground between the cinder blocks. A series of rice cookers filled with water were then placed under the ceiling panels.

The ceiling panels are placed concrete-side up, and water (200 mL) is added to each concrete paving stone. A solution is prepared in a plastic handheld pump sprayer by diluting a Formulation with water to achieve a final concentration of 3 oz/gal in water, and then applied to the paving stones. The ceiling panels are then returned to the simulated meat-packing plant environment (i.e., suspended concrete-side down over the ground between the cinder blocks via supporting the boards on the cinder block walls), the rice cookers turned on to heat the water and create a condensation condition via generating water vapor (steam), and a tarp is placed over the building model to contain/retain humidity therein. The paving stones are steamed for 2 hours, during which time water is added to the rice cookers as necessary to maintain a near-full water level in each rice cooker. After the steaming is complete, the tarp is temporarily pulled back, the rice cookers are removed from the interior of the building model, the ground beneath the paving stones is covered with catch pans to capture any dripping water, and the tarp replaced about the building model. Condensate drippage is collected in the pans for 2 hours before being carefully removed from the building model in the pans, combined, and weighed.

The procedure above is repeated for a series of condensation reduction compositions from Preparation Example 1 in Example 9 and Comparative Examples 4-7, the particular components and results of which are set forth in Table 5 below.

TABLE 5

Quantitative Condensate Drippage Assessment Results

| Example | Formulation | Mass of Drips (g) |
|---|---|---|
| Ex. 9 | 8 | 1.83 |
| Comp. Ex. 4 | 2 | 5.60 |
| Comp. Ex. 5 | 5 | 2.69 |
| Comp. Ex. 6 | 6 | 5.42 |
| Comp. Ex. 7 | N/A (control) | 2.98 |

As demonstrated, the method may be used to reduce the amount of condensate on a surface, which, when treated with the condensation reduction composition, will show a reduction in condensation and/or an increased drying speed upon exposure to a condensation condition, as compared to untreated surfaces of the same material exposed to the same condensation condition. Moreover, the particular components selected for use in formulating the condensation reduction composition will impact the efficacy of condensation reduction, with surface-active agents comprising an alkyl polyglycoside, optionally in combination with the preservative and/or pH control agents described herein, providing unexpected and superior results over conventional surfactants.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A method of treating a surface to reduce condensate and/or formation of condensate thereon, said method comprising:
    disposing a condensation reduction composition on the surface which is defined as an overhead surface that is a surface of a structure disposed above an area at a height sufficient for a person to stand and/or sit underneath, the overhead surface being a porous, horizontal surface that is a concrete ceiling of a room in a food processing facility, the condensation reduction composition comprising a surface-active agent comprising an alkyl polyglycoside, thereby treating the surface to reduce formation of condensate and/or an amount of condensate thereon.

2. The method of claim 1, wherein the condensation reduction composition comprises the surface-active agent in an amount of from 0.0005 to 100 wt. %, based on the total weight of the condensation reduction composition.

3. The method of claim 1, wherein the surface-active agent comprises a C8-C16 alkyl polyglucoside.

4. The method of claim 3, wherein the condensation reduction composition comprises the C8-C16 alkyl polyglucoside in an amount of from 0.07 to 30 wt. %, based on the total weight of the condensation reduction composition.

5. The method of claim 1, wherein the condensation reduction composition further comprises (B) a preservative.

6. The method of claim 5, wherein the preservative: (i) comprises sodium benzoate; (ii) is present in the condensation reduction composition in an amount of from 0.001 to 1 wt. %, based on the total weight of the condensation reduction composition; or (iii) both (i) and (ii).

7. The method of claim 1, wherein the condensation reduction composition comprises a pH of from 2.0 to 12.5.

8. The method of claim 1, wherein the condensation reduction composition further comprises a pH control agent.

9. The method of claim 8, wherein the condensation reduction composition comprises the pH control agent in an amount of from 0.01 to 6 wt. %, based on the total weight of the condensation reduction composition.

10. The method of claim 8, wherein the pH control agent comprises: (i) sodium citrate; (ii) citric acid; or (iii) both (i) and (ii).

11. The method of claim 10, wherein the pH control agent comprises the sodium citrate, and wherein the condensation reduction composition comprises the sodium citrate in an amount of from 0.0003 to 0.1 wt. %, based on the total weight of the condensation reduction composition.

12. The method of claim 10, wherein the pH control agent comprises the citric acid, and wherein the condensation reduction composition comprises the citric acid in an amount of from 0.01 to 5 wt. %, based on the total weight of the condensation reduction composition.

13. The method of claim 1, wherein the condensation reduction composition comprises water in an amount of from 65 to 99.9 wt. %, based on the total weight of the condensation reduction composition.

14. The method of claim 1, further comprising: (i) preparing the condensation reduction composition prior to disposing the condensation reduction composition on the surface; or (ii) preparing the condensation reduction composition on the surface.

15. The method of claim 1, wherein the condensation reduction composition is disposed on the surface as: (i) a spray; (ii) an aerosol; (iii) a solution; (iv) a foam; or (v) any combination of (i)-(iv).

16. The method of claim 1, wherein disposing the condensation reduction composition on the surface comprises applying the condensation reduction composition to the surface via: (i) spraying; (ii) brushing; (iii) mopping; or (iv) any combination of (i)-(iii).

17. The method of claim 1, further comprising: (i) exposing the surface to a condensation condition subsequent to disposing the condensation reduction composition on the surface: (ii) exposing the surface to a condensation condition concurrently with disposing the condensation reduction composition on the surface; or (iii) both (i) and (ii).

18. The method of claim 1, wherein reducing the amount of condensate and/or formation of condensate on the surface comprises: (i) reducing a number of condensate drops falling from the surface during exposure to a condensation condition; (ii) increasing a rate of condensate evaporation on the surface during exposure to a condensation condition; (iii) increasing a rate of water absorption into or through the surface; or (iv) any combination of (i)-(iii).

19. A treated surface prepared in accordance with the method of claim 1.

* * * * *